United States Patent
Li et al.

(10) Patent No.: US 8,970,080 B2
(45) Date of Patent: Mar. 3, 2015

(54) ELECTRIC MOTOR HAVING REDUCED COGGING TORQUE

(75) Inventors: Hu Li, Osaka (JP); Yuichi Yoshikawa, Osaka (JP); Hiroshi Murakami, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 603 days.

(21) Appl. No.: 12/100,535

(22) Filed: Apr. 10, 2008

(65) Prior Publication Data

US 2009/0009019 A1    Jan. 8, 2009

(30) Foreign Application Priority Data

Jul. 5, 2007  (JP) ................................ 2007-176916

(51) Int. Cl.
  *H02K 16/02*  (2006.01)
  *H02K 29/03*  (2006.01)
  *H02K 1/27*   (2006.01)

(52) U.S. Cl.
  CPC ............... *H02K 16/02* (2013.01); *H02K 29/03* (2013.01)
  USPC .......................................... 310/114; 310/266

(58) Field of Classification Search
  CPC ............. H02K 1/22; H02K 1/27; H02K 7/20; H02K 16/02; H02K 17/44
  USPC ............... 310/266, 114, 112, 268, 216, 124, 310/216.111, 216.112
  IPC .................. H02K 1/22, 16/02, 7/20, 17/44, 1/27
  See application file for complete search history.

(56) References Cited

U.S. PATENT DOCUMENTS

| | | | |
|---|---|---|---|
| 5,285,124 A * | 2/1994 | Satake et al. ................... | 310/114 |
| 6,008,559 A * | 12/1999 | Asano et al. ............. | 310/156.53 |
| 6,590,312 B1 * | 7/2003 | Seguchi et al. ............... | 310/266 |
| 6,744,164 B2 * | 6/2004 | Kadoya et al. ................ | 310/114 |
| 6,924,574 B2 | 8/2005 | Qu et al. | |
| 6,995,494 B2 * | 2/2006 | Haugan et al. ................ | 310/268 |
| 2004/0239199 A1 * | 12/2004 | Qu et al. ........................ | 310/114 |

(Continued)

FOREIGN PATENT DOCUMENTS

| | | |
|---|---|---|
| JP | 3-3622 A | 1/1991 |
| JP | 04-105530 A | 4/1992 |
| JP | 2000-209795 A | 7/2000 |

(Continued)

OTHER PUBLICATIONS

Chinese Office Action for Application No. 200810094818.9, Aug. 5, 2010, Panasonic Corporation.

(Continued)

*Primary Examiner* — Michael Andrews
(74) *Attorney, Agent, or Firm* — RatnerPrestia

(57) ABSTRACT

Having a stator core including a yoke, a plurality of inside teeth, and a plurality of outside teeth, an inside rotor, and an output rotor, the inside slot open angle/inside pole angle and the outside slot open angle/outside pole angle are determined so that the inside cogging torque due to rotation of the inside rotor and the outside cogging torque due to rotation of the outside rotor may cancel each other in inverted phases. Plural combinations are provided so that the amplitude of inside cogging torque and the amplitude of outside cogging torque due to rotation of outside rotor maybe approximate values in inverted phase, and the combination of the highest combined voltage value of the both induced voltage is selected.

12 Claims, 7 Drawing Sheets

(56) References Cited

U.S. PATENT DOCUMENTS

2007/0205682 A1* 9/2007 Choi et al. .................. 310/114
2009/0091204 A1 4/2009 Koshiba et al.

FOREIGN PATENT DOCUMENTS

| JP | 2006-14560 A | 1/2006 |
| JP | 2006-345682 A | 12/2006 |
| WO | WO 2007/043506 A1 | 4/2007 |

OTHER PUBLICATIONS

JP Office Action for 2008-071014, Oct. 2, 2012.

* cited by examiner

Inside slot open angle/inside pole angle

Outside slot open angle/outside pole angle

Inside slot open angle/inside pole angle

Outside slot open angle/outside pole angle

Outside slot open angle        Inside slot open angle

ELECTRIC MOTOR HAVING REDUCED COGGING TORQUE

FIELD OF THE INVENTION

The present invention relates to a high power electric motor reduced in the cogging torque.

BACKGROUND OF THE INVENTION

Such electric motor reduced in the cogging torque is disclosed, for example, Unexamined Japanese Patent Publication No. H4-105530 (document 1) or Unexamined Japanese Patent Publication No. 2000-209795 (document 2).

The electric motor disclosed in document 1 has its stator core divided into a tooth section and a yoke section, and the concentrated wound tooth section is engaged with the yoke section. In this configuration, the coil space factor in the slot is 60% or more. Further, the gap between tips of the tooth section, that is, the slot open size is 0.5 mm or less, and hence the Carter coefficient is larger, and the change of magnetic resistance in relation to the rotor is smaller. It is therefore disclosed that the magnetic loss of the stator can be decreased, while the cogging torque can be reduced to half.

FIG. 10 is a diagram showing the relation of slot open angle/pole angle and induced voltage and cogging torque, in a conventional electric motor as disclosed in document 1. In FIG. 10, the induced voltage (Back EMF, Back Electromotive Force) is indicated by a solid line, and the cogging torque is indicated by a dotted line. The ratio of slot open angle/pole angle shows the rate of the slot open angle to the pole angle.

It was hitherto believed, as shown in FIG. 10, that the cogging torque could be reduced by setting the slot open angle smaller provided the pole angle be the same. Document 1 discloses a technology of reducing the cogging torque by setting the slot open size to 0.5 mm or less.

The electric motor disclosed in document 2 is composed to link the outer circumferences of stators by a notched portion which is a part of laminating thin steel plates. In such configuration, the space factor is increased, and a high output, and a small and light structure may be realized. At the same time, the cogging torque can be suppressed.

However, in the technologies of document 1 and document 2, since the slot open size is smaller, a leakage flux may occur between adjacent teeth. As a result, the output torque may be reduced.

SUMMARY OF THE INVENTION

To solve these problems, the electric motor of the present invention has a stator including a yoke, a stator core having a plurality of inside teeth projecting in the inside direction of the yoke and plurality of outside teeth projecting in the outside direction of the yoke, and a winding wound on the stator core; an inside rotor opposite to the end face of leading ends of the inside teeth across a gap, including an inside rotor core rotatably held on the stator, and a plurality of poles held on the inside rotor core; and an outside rotor opposite to the end face of leading ends of the outside teeth across a gap, including an outside rotor core rotatably held on the stator, and a plurality of poles held on the outside rotor core. The ratio of the angle formed by mutual leading end faces of the adjacent inside teeth and the angle formed by the both ends in the circumferential direction of poles of the inside rotor, and the ratio of the angle formed by mutual leading end faces of the adjacent outside teeth and the angle formed by the both ends in the circumferential direction of poles of the outside rotor are determined so that the inside cogging torque caused by rotation of the inside rotor and the outside cogging torque caused by rotation of the outside rotor may cancel each other in inverted phases.

In this configuration, the inside cogging torque and the outside cogging torque cancel each other, and a combined cogging torque is synthesized, and the output torque can be enhanced while suppressing the combined cogging torque at a low level.

DETAILED DESCRIPTION OF PREFERRED EMBODIMENT

A preferred embodiment of the present invention is specifically described below by referring to the accompanying drawings.

Figure 1:
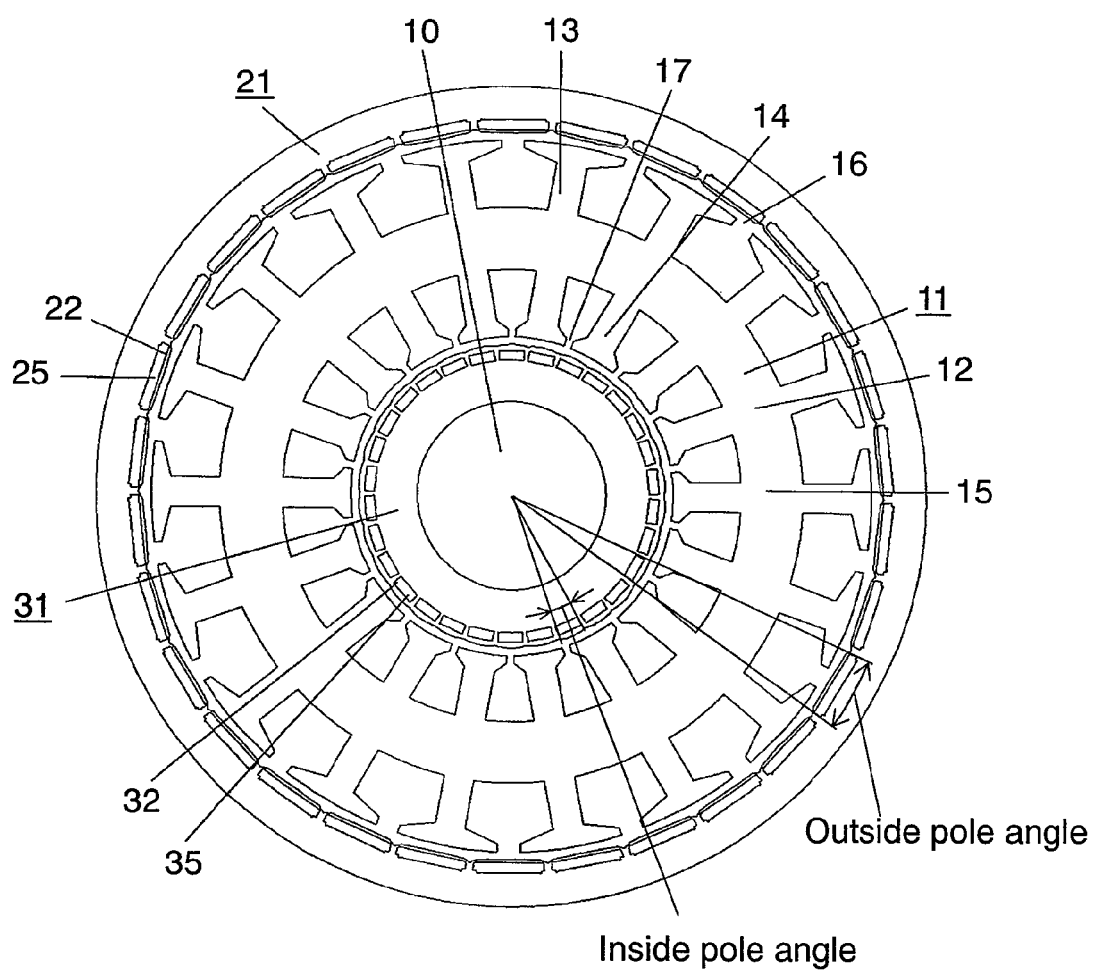
FIG. 1 is a sectional view of an electric motor in a preferred embodiment of the present invention.

FIG. 1 is a sectional view of an electric motor in a preferred embodiment of the present invention.

The electric motor of the preferred embodiment comprises stator 11, outside rotor 21, and inside rotor 31.

Stator 11 includes stator core 15, and a winding (not shown) wound on stator core 15. Stator core 15 has annular yoke 12, a plurality of outside teeth 13 projecting in the outside direction from yoke 12, and a plurality of inside teeth 14 projecting in the inside direction from yoke 12. Yoke 12 is provided with a winding (not shown) wired by three-phase star or delta winding. The winding method is not specified, and may include toroidal method, concentrated winding method, and distributed winding method.

In stator core 15, a plurality of outside slots are formed of yoke 12 and mutually adjacent outside teeth 13. Similarly, a plurality of inside slots are formed of yoke 12 and mutually adjacent inside teeth 14.

Inside rotor 31 is opposite to the inner circumference at the end face of the leading end of inside teeth 14 across a gap, and has an inside rotor core rotatably held with respect to stator 11, and includes a plurality of poles held on this inside rotor core. Outside rotor 21 is opposite to the outer circumference at the end face of the leading end of outside teeth 13 across a gap, and has an outside rotor core rotatably held with respect to stator 11, and includes a plurality of poles held on this outside rotor core.

Inside rotor 31 and outside rotor 21 are coupled to each other. The coupling method may include an adhesive, bolts, or resin molding. Inside rotor 31 and outside rotor 21 are further coupled to rotary shaft 10 by means of adhesive or molding agent.

A plurality of magnet burying holes 32 are formed in inside rotor 31, and permanent magnets 35 are inserted in these magnet burying holes 32 as poles. Similarly, a plurality of magnet burying holes 22 are formed in outside rotor 21, and permanent magnets 25 are inserted in these magnet burying holes 22 as poles. Thus, inside rotor 31 having a plurality of poles and outside rotor 21 having a plurality of poles are formed.

Inside rotor 31 of the preferred embodiment is formed of a plurality of magnetic thin iron plates laminated in the thickness direction. Similarly, outside rotor 21 is formed of a plurality of magnetic thin iron plates laminated in the thickness direction. As a result, as compared with the rotor formed of iron ingot, the efficiency is enhanced.

By adjusting the ratio of inside slot open angle of inside slot open 17 and inside pole angle, and the ratio of outside slot open angle of outside slot open 16 and outside pole angle, it is intended to reduce substantially the combined cogging torque composed of inside cogging torque due to rotation of inside rotor 31 and outside cogging torque due to rotation of outside rotor 21.

The inside slot open angle is an angle formed by an end interval (slot open 17) at the mutual leading ends of adjacent inside teeth 14, on the center of rotation of rotary shaft 10. The inside pole angle is an angle formed by both ends in circumferential direction of the poles of inside rotor 31 (both ends in circumferential direction of permanent magnets 35). The outside slot open angle is an angle formed by an end interval (slot open 16) at the mutual leading ends of adjacent outside teeth 13, on the center of rotation of rotary shaft 10. The outside pole angle is an angle formed by both ends in circumferential direction of the poles of outside rotor 21 (both ends in circumferential direction of permanent magnets 25), on the center of rotation rotary shaft 10.

In the preferred embodiment, by adjusting these angles, the output torque is increased while decreasing the cogging torque.

The adjustment of the ratio of inside slop open angle and inside pole angle, and the ratio of outside slot open angle and outside pole angle is explained. In the explanation of the ratios, the rate of inside slot open angle to inside pole angle is mentioned as inside slot open angle/inside pole angle, and the rate of outside slot open angle to outside pole angle is mentioned as outside slot open angle/outside pole angle.

Figure 2:
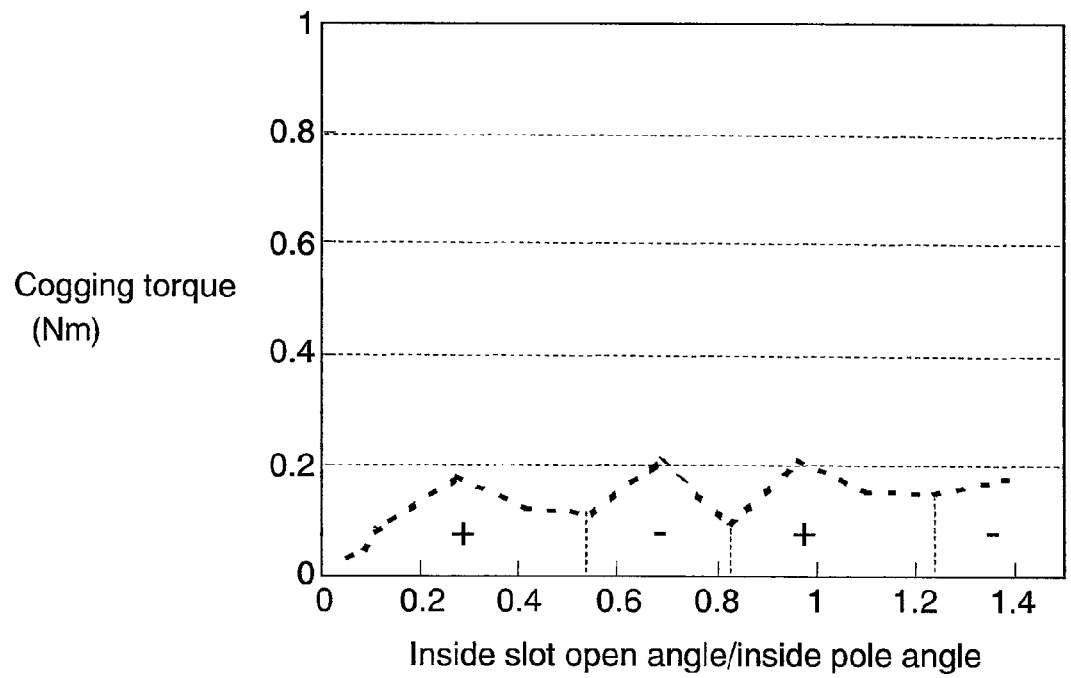
FIG. 2 is a diagram showing the relation of inside slot open angle/inside pole angle and amplitude of cogging torque.
Figure 3:
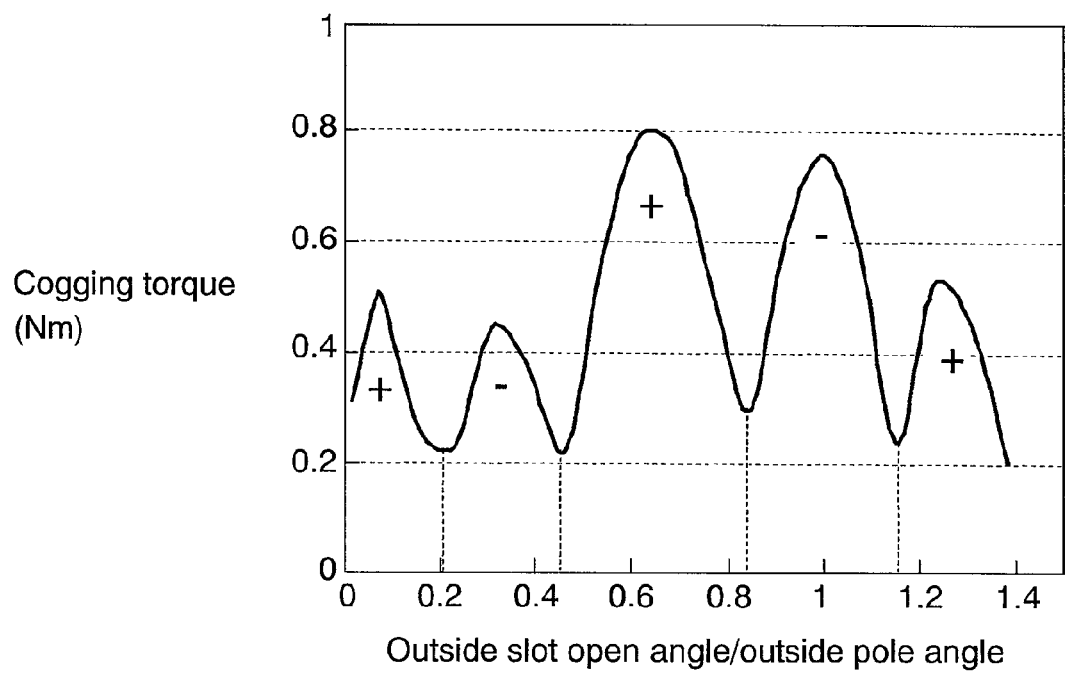
FIG. 3 is a diagram showing the relation of outside slot open angle/outside pole angle and amplitude of cogging torque.
Figure 4:
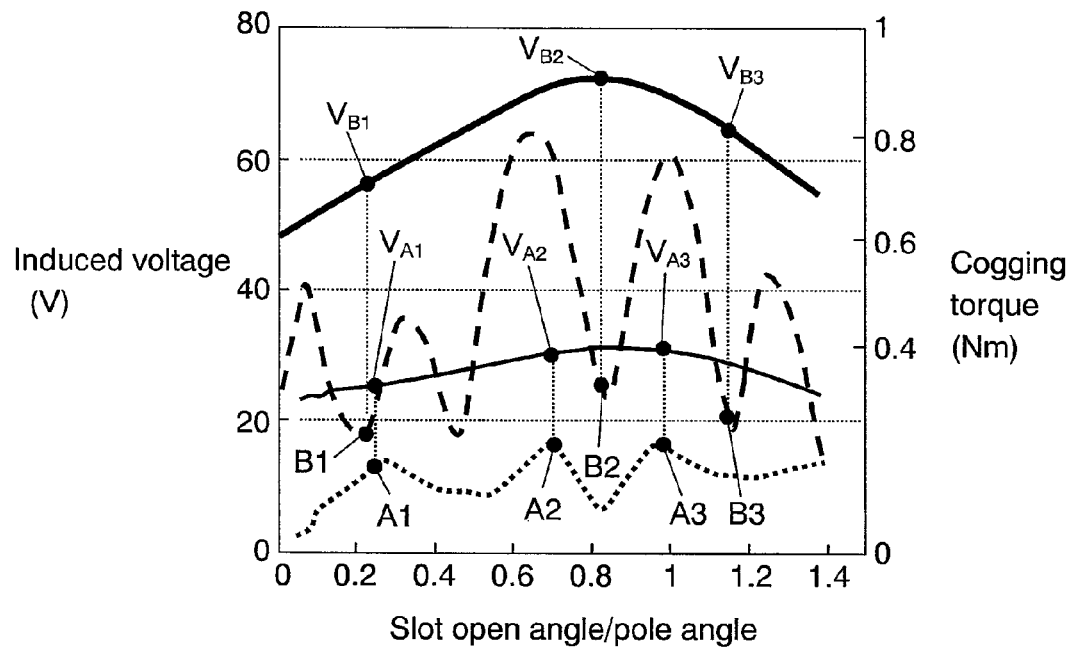
FIG. 4 is a diagram showing the relation of inside slot open angle/inside pole angle and amplitude of cogging torque and induced voltage, and the relation of outside slot open angle/outside pole angle and amplitude of cogging torque and induced voltage.

FIG. 2 is a diagram showing the relation of inside slot open angle/inside pole angle and amplitude of cogging torque. FIG. 3 is a diagram showing the relation of outside slot open angle/outside pole angle and amplitude of cogging torque. FIG. 4 is a diagram showing the relation of inside slot open angle/inside pole angle and amplitude of cogging torque and induced voltage, and the relation of outside slot open angle/outside pole angle and amplitude of cogging torque and induced voltage. In FIG. 2 and FIG. 3, the + symbol and the − symbol refer to the polarity of phase.

As shown in FIG. 2, when the inside slot open angle/inside pole angle is changed, the amplitude of cogging torque varies like waves. Of the wave-like changes of the amplitude of cogging torque, from the boundary point of the minimal point of the bottom, the phase of the cogging torque is inverted.

As shown in FIG. 3, when the outside slot open angle/outside pole angle is changed, the amplitude of cogging torque varies like waves. Of the wave-like changes of the amplitude of cogging torque, from the boundary point of the minimal point of the bottom, the phase of the cogging torque is inverted.

The amplitude of inside cogging torque by inside rotor 31 in FIG. 2, and the amplitude of outside cogging torque by outside rotor 21 in FIG. 3 are synthesized in inverted phases. The individual cogging torques cancel each other, and the combined cogging torque is suppressed low. When the amplitudes of the cogging torques are adjusted to same or similar values in inverted phases, the inside cogging torque by inside rotor 31 and the outside cogging torque by outside rotor 21 can be canceled appropriate, and the combined cogging torque is reduced substantially.

That is, in the electric motor of the preferred embodiment, in order that the inside cogging torque and the outside cogging torque may be mutually canceled in the inverted phases, the ratio of the angle formed by mutual leading end faces of adjacent inside teeth 14 and the angle formed by the both ends in the circumferential direction of poles of inside rotor 31, and the ratio of the angle formed by mutual leading end faces of adjacent outside teeth 13 and the angle formed by the both ends in the circumferential direction of poles of outside rotor 21 are determined appropriately. By such setting, the inside slot open angle/inside pole angle, and the outside slot open angle/outside pole angle are determined so that the amplitude of inside cogging torque and the amplitude of outside cogging torque may be same or similar values.

In the combination of inside rotor and outside rotor shown in FIG. 2 to FIG. 4, there is no coinciding point of amplitude of cogging torque by inside rotor 31 and amplitude of cogging torque by outside rotor 21 in inverted phases shown in FIG. 4.

In such a case, plural points are selected as approximate values of amplitude of cogging torque by inside rotor 31 and amplitude of cogging torque by outside rotor 21 in inverted phases. For example, as shown in FIG. 4, a combination of A1 and B1, a combination of A2 and B2, and a combination of A3 and B3 are selected.

Out of these combinations, one of the highest value of combined voltage value of induced voltage by inside rotor 31 and induced voltage by outside rotor 21 is selected. That is, comparing the combined value of induced voltage VA1 corresponding to A1 and induced voltage VB1 corresponding to B1, the combined value of induced voltage VA2 corresponding to A2 and induced voltage VB2 corresponding to B2, and the combined value of induced voltage VA3 corresponding to A3 and induced voltage VB3 corresponding to B3, the combined value of induced voltage VA2 corresponding to A2 and induced voltage VB2 corresponding to B2 is the highest value. In this case, therefore, the combination of A2 and B2 is selected. By selecting the values of these combinations, the output torque can be further enhanced.

The magnitude of cogging torque and the magnitude of induced voltage varies with the diameter of the rotor. Hence, in an electric motor having a rotor of different diameter from the motor shown in FIG. 2 to FIG. 4, different values from FIG. 2 to FIG. 4 are obtained.

Figure 5:
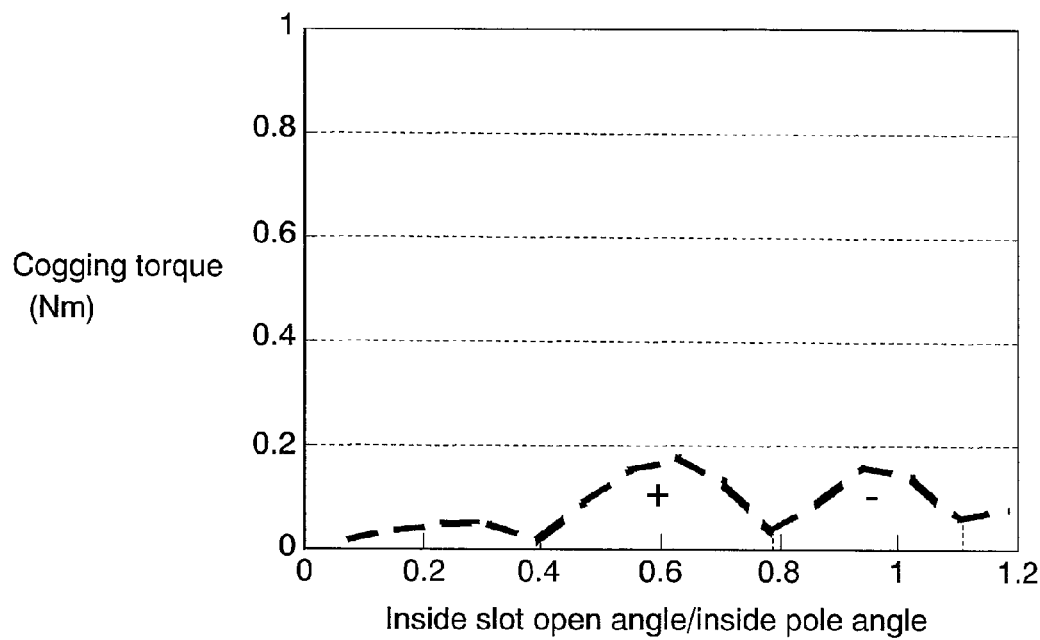
FIG. 5 is a diagram showing other example of the relation of inside slot open angle/inside pole angle and amplitude of cogging torque.
Figure 6:
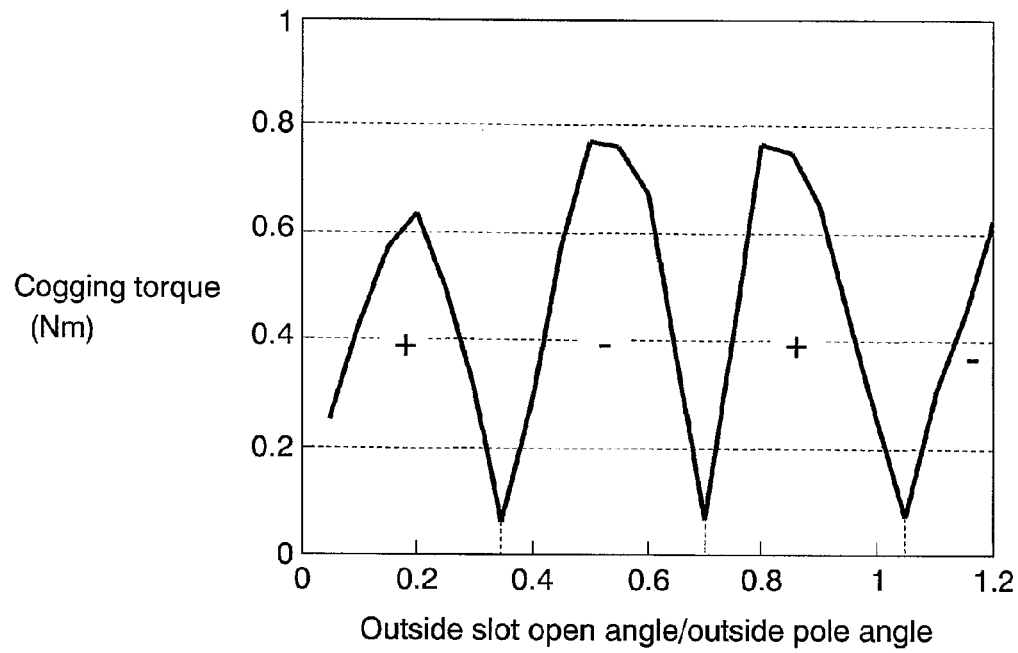
FIG. 6 is a diagram showing other example of the relation of outside slot open angle/outside pole angle and amplitude of cogging torque.
Figure 7:
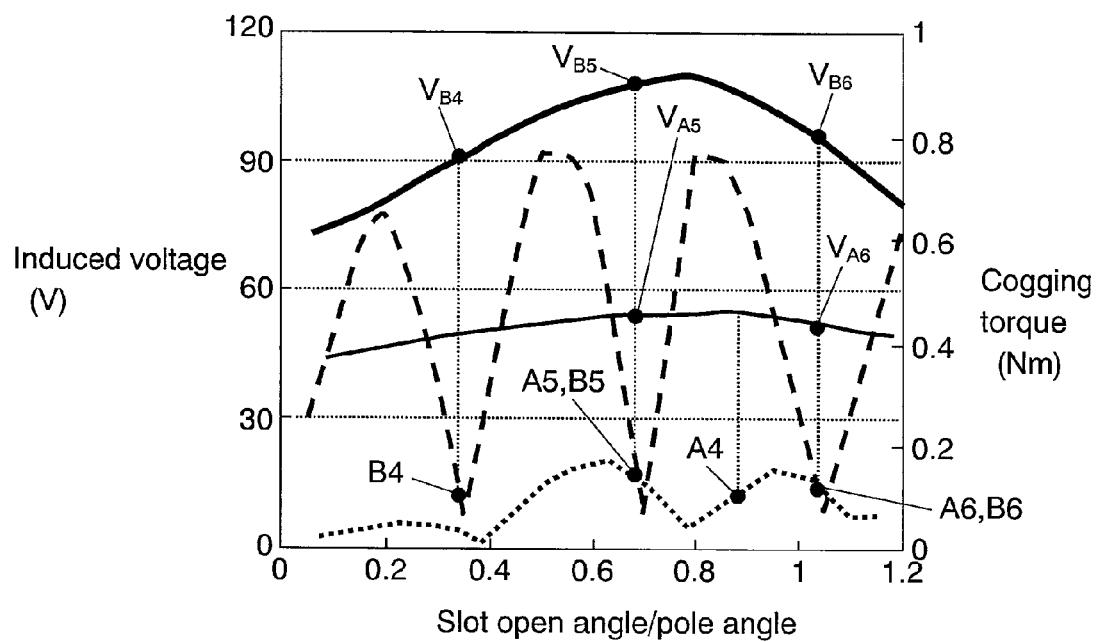
FIG. 7 is a diagram showing other example of the relation of inside slot open angle/inside pole angle and amplitude of cogging torque and induced voltage, and the relation of outside slot open angle/outside pole angle and amplitude of cogging torque and induced voltage.

FIG. 5 is a diagram showing the relation of inside slot open angle/inside pole angle and amplitude of cogging torque in an inside rotor having a different diameter from the inside rotor shown in FIG. 2. FIG. 6 is a diagram showing the relation of outside slot open angle/outside pole angle and amplitude of cogging torque in an outside rotor having a different diameter from the outside rotor shown in FIG. 3. FIG. 7 is a diagram showing the relation of inside slot open angle/inside pole angle and amplitude of cogging torque and induced voltage, and the relation of outside slot open angle/outside pole angle and amplitude of cogging torque and induced voltage in an inside rotor and an outside rotor having different diameters from the inside rotor and the outside rotor shown in FIG. 6.

In the combinations of inside rotor and outside rotor shown in FIG. 5 to FIG. 7, there are plural coinciding points of amplitude of cogging torque by inside rotor 31 and amplitude of cogging torque by outside rotor 21 in inverted phases as shown in FIG. 7.

In such a case, plural points of coinciding values of amplitude of cogging torque by inside rotor 31 and amplitude of cogging torque by outside rotor 21 in inverted phases are selected. For example, as shown in FIG. 7, a combination of A4 and B4, a combination of A5 and B5, and a combination of A6 and B6 are selected.

Out of these combinations, one of the highest value of combined voltage value of induced voltage by inside rotor 31 and induced voltage by outside rotor 21 is selected. That is, comparing the combined value of induced voltage VA4 corresponding to A4 and induced voltage VB4 corresponding to B4, the combined value of induced voltage VA5 corresponding to A5 and induced voltage VB5 corresponding to B5, and the combined value of induced voltage VA6 corresponding to A6 and induced voltage VB6 corresponding to B6, the combined value of induced voltage VA5 corresponding to A5 and induced voltage VB5 corresponding to B5 is the highest value. In this case, therefore, the combination of A5 and B5 is selected. By selecting the values of these combinations, the output torque can be further enhanced.

Thus, the output torque can be enhanced while reducing the cogging torque by adjusting the inside slot open angle/inside pole angle and the outside slot open angle/outside pole angle, and equalizing or approximating the amplitude of inside cogging torque due to rotation of inside rotor and the amplitude of outside cogging torque due to rotation of outside rotor.

The following is the explanation of the reason of forming inside rotor 31 and outside rotor 21 by laminating a plurality of thin iron plates.

Figure 8:
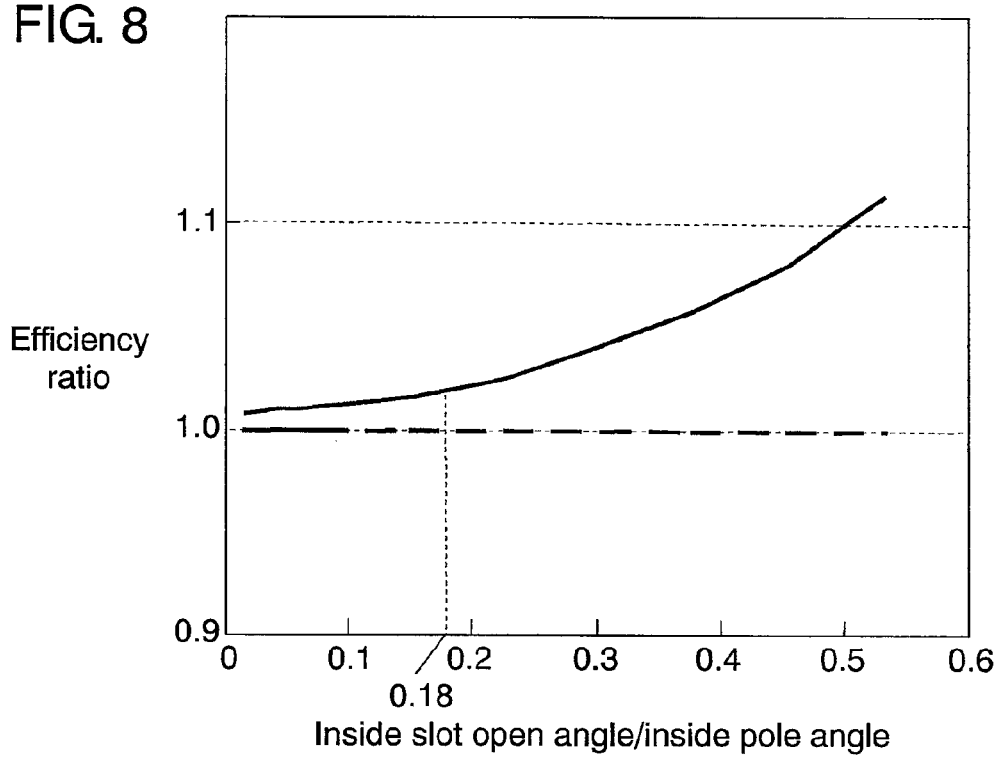
FIG. 8 is a diagram showing the relation of slot open angle/pole angle and efficiency, between an inside rotor formed by laminating thin iron plates and an inside rotor formed of iron ingot.
Figure 9:
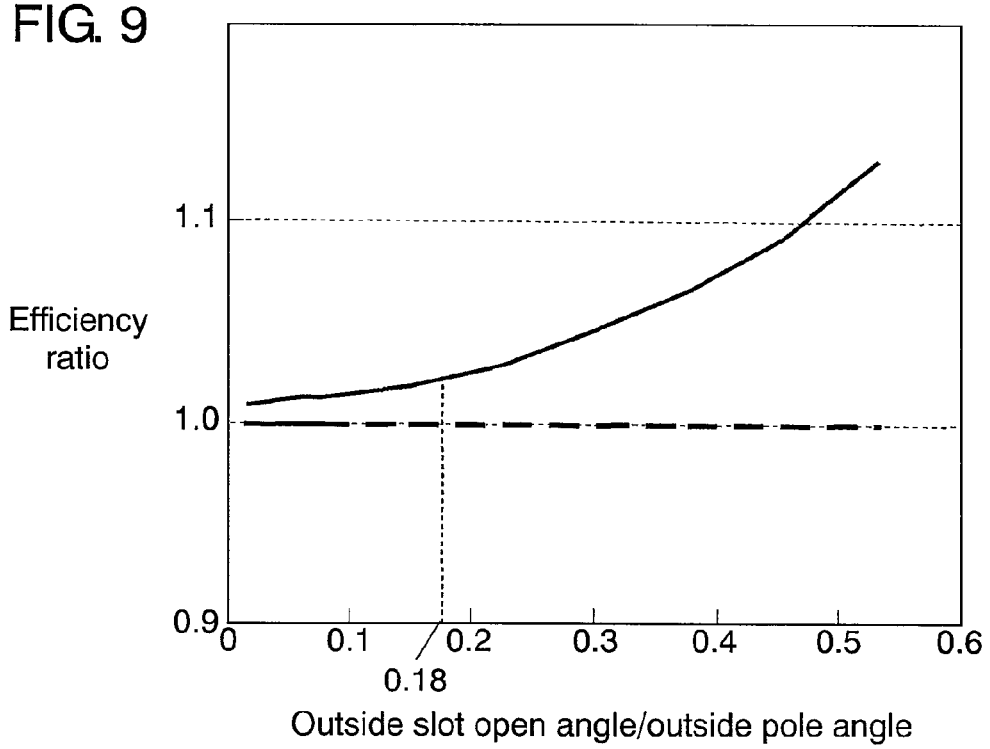
FIG. 9 is a diagram showing the relation of slot open angle/pole angle and efficiency, between an outside rotor formed by laminating thin iron plates and an outside rotor formed of iron ingot.
Figure 10:
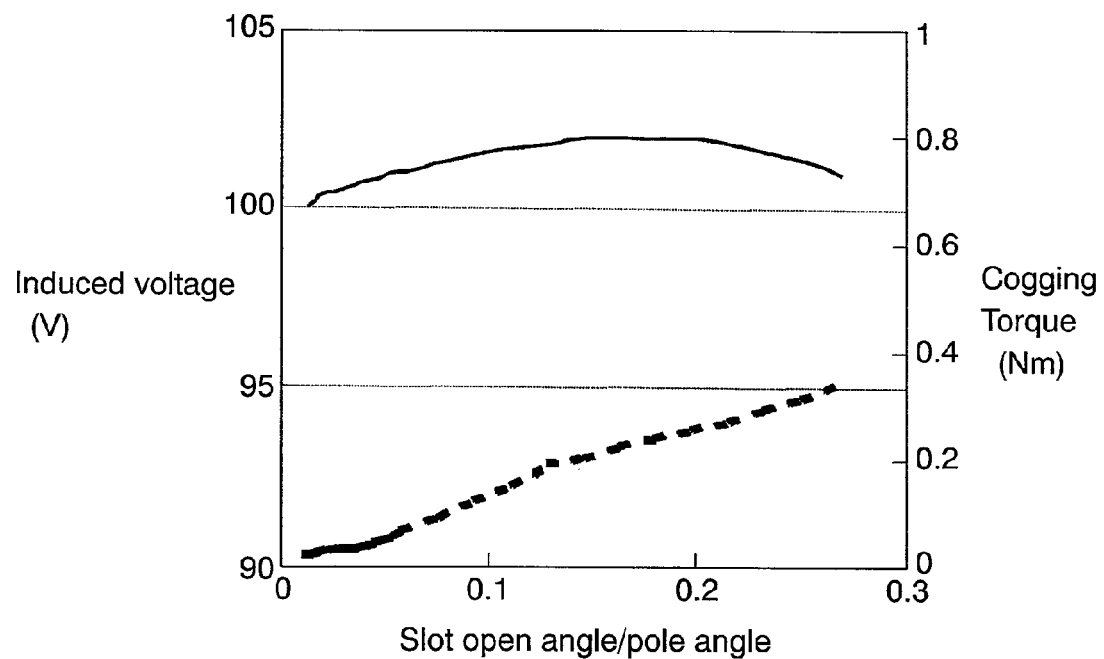
FIG. 10 is a diagram showing the relation of slot open angle/pole angle and induced voltage and cogging torque, in a conventional electric motor.
Figure 11:
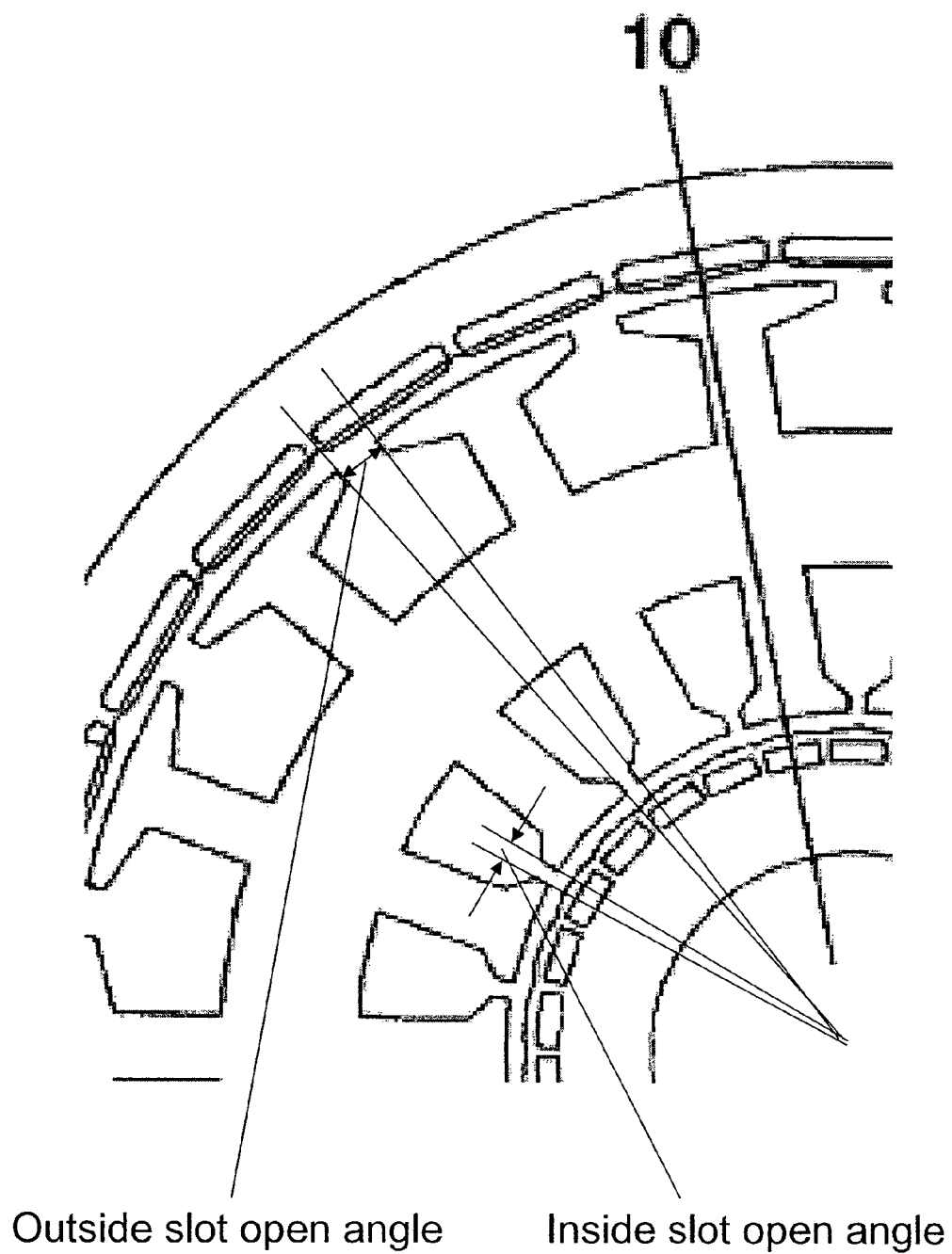
FIG. 11 is an expanded partial view of the electric motor of FIG. 1 showing the inside slot open angle and the outside slot open angle.

FIG. 8 is a diagram showing the relation of slot open angle/pole angle and efficiency, between an inside rotor formed by laminating thin iron plates and an inside rotor formed of iron ingot. FIG. 9 is a diagram showing the relation of slot open angle/pole angle and efficiency, between an outside rotor formed by laminating thin iron plates and an outside rotor formed of iron ingot. In FIG. 8 and FIG. 9, the broken line refers to iron ingot, and the solid line refers to the thin plate. In FIG. 8, the efficiency of the inside rotor formed of iron ingot is expressed as 1, and in FIG. 9, the efficiency of the outside rotor formed of iron ingot is expressed as 1.

As shown in FIG. 8, by comparing between an inside rotor formed by laminating thin iron plates and an inside rotor formed of iron ingot, the inside rotor formed by laminating thin iron plates shows a higher efficiency in any slot open angle/pole angle as compared with the inside rotor formed of iron ingot. At the slot open angle/pole angle of 0.18 or more, the difference in efficiency is suddenly increased between the inside rotor formed by laminating thin iron plates and the inside rotor formed of iron ingot.

As shown in FIG. 9, by comparing between an outside rotor formed by laminating thin iron plates and an outside rotor formed of iron ingot, the outside rotor formed by laminating thin iron plates shows a higher efficiency in any slot open angle/pole angle as compared with the outside rotor formed of iron ingot. At the slot open angle/pole angle of 0.18 or more, the difference in efficiency is suddenly increased between the outside rotor formed by laminating thin iron plates and the outside rotor formed of iron ingot.

Hence, by forming inside rotor 31 and outside rotor 21 by laminating a plurality of thin iron plates, as compared with the rotors formed of iron ingot, the efficiency is enhanced. The efficiency is particularly improved at the slot open angle/pole angle of 0.18 or more.

In the preferred embodiment, the magnets are inserted and fixed in a plurality of magnet burying holes formed in the inside rotor and the outside rotor, but the magnets may be adhered and fixed to the surface of the inside rotor and the outside rotor.

In FIG. 1, twelve inside and outside teeth each are provided, and twenty inside and output poles each are provided, but the number is not limited, and the inside and outside teeth may be provided in any number, and the inside and outside poles may be provided in any number.

As described herein, the electric motor of the present invention is an electric motor of reduced cogging torque and enhanced output, and is particularly useful as an electric motor for electric household appliance or electrical equipment.

What is claimed is:

1. An electric motor comprising:
   a stator including a yoke, a stator core having a plurality of inside teeth projecting in the inside direction of the yoke forming a plurality of inside slot open angles and a plurality of outside teeth projecting in the outside direction of the yoke forming a plurality of outside slot open angles, and a winding wound on the stator core;
   an inside rotor opposite to the end face of leading ends of the inside teeth across a gap, including an inside rotor core rotatably held on the stator, and a plurality of poles held on the inside rotor core forming a plurality of inside pole angles; and
   an outside rotor opposite to the end face of leading ends of the outside teeth across a gap, including an outside rotor core rotatably held on the stator, and a plurality of poles held on the outside rotor core forming a plurality of outside pole angles,
   wherein the inside rotor generates an induced voltage at a predetermined speed and causes an inside cogging torque dependent on a ratio of the inside slot open angle to the inside pole angle, and the outside rotor generates another induced voltage at the predetermined speed and causes an outside cogging torque dependent on a ratio of the outside slot open angle to the outside pole angle, wherein the ratios are adjusted so that (i) the inside cogging torque and the outside cogging torque substantially cancel each other in inverted phases and
   (ii) the sum of the induced voltage due to the inside rotor at the predetermined speed and the induced voltage due to the outside rotor at the predetermined speed is maximized.

2. The electric motor of claim 1,
wherein on the center of rotation,
the inside slot open angle is an angle formed by an end interval at the mutual leading ends of adjacent inside teeth, the inside pole angle is an angle formed by both ends in a circumferential direction of the poles of the inside rotor, the rate of the inside slot open angle to the inside pole angle is an inside slot open angle/inside pole angle,
the outside slot open angle is an angle formed by an end interval at the mutual leading ends of adjacent outside teeth, the outside pole angle is an angle formed by both ends in a circumferential direction of the poles of the outside rotor, and the rate of the outside slot open angle to the outside pole angle is an outside slot open angle/outside pole angle, and
the inside slot open angle/inside pole angle and the outside slot open angle/outside pole angle are determined so that the amplitude of the inside cogging torque and the amplitude of the outside cogging torque may be same vales or most approximate values.

3. The electric motor of claim 2,
wherein the inside rotor is formed by laminating a plurality of thin magnetic plates in the thickness direction.

4. The electric motor of claim 3,
wherein the outside rotor is formed by laminating a plurality of thin magnetic plates in the thickness direction.

5. The electric motor of claim 2,
wherein the outside rotor is formed by laminating a plurality of thin magnetic plates in the thickness direction.

6. The electric motor of claim 1,
wherein the inside rotor is formed by laminating a plurality of thin magnetic plates in the thickness direction.

7. The electric motor of claim 1,
wherein the outside rotor is formed by laminating a plurality of thin magnetic plates in the thickness direction.

8. The electric motor of claim 1,
wherein the inside rotor is formed by laminating a plurality of thin magnetic plates in the thickness direction, and the outside rotor is formed by laminating a plurality of thin magnetic plates in the thickness direction.

9. The electric motor of claim 1,
wherein the ratio of the inside slot open angle to the inside pole angle is 0.18 or more.

10. The electric motor of claim 1,
wherein the ratio of the outside slot open angle to the outside pole angle is 0.18 or more.

11. The electric motor of claim 1,
wherein the ratio of the inside slot open angle to the inside pole angle is 0.18 or more, and the ratio of the outside slot open angle to the outside pole angle is 0.18 or more.

12. The electric motor of claim 1,
wherein the inner and outer rotor are coupled to each other by resin molding.

\* \* \* \* \*